(12) United States Patent
Hoshino

(10) Patent No.: US 8,253,816 B2
(45) Date of Patent: Aug. 28, 2012

(54) VIDEO SIGNAL PROCESSING FOR GENERATING A LEVEL MIXED SIGNAL

(75) Inventor: Kouichi Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1005 days.

(21) Appl. No.: 12/280,745

(22) PCT Filed: Feb. 28, 2007

(86) PCT No.: PCT/JP2007/053765
§ 371 (c)(1),
(2), (4) Date: Aug. 26, 2008

(87) PCT Pub. No.: WO2007/100002
PCT Pub. Date: Sep. 7, 2007

(65) Prior Publication Data
US 2009/0009623 A1    Jan. 8, 2009

(30) Foreign Application Priority Data
Feb. 28, 2006    (JP) .................................. 2006-052214

(51) Int. Cl.
*H04N 5/228* (2006.01)
(52) U.S. Cl. .................... 348/222.1; 348/221.1; 348/362
(58) Field of Classification Search ............... 348/222.1, 348/221.1, 362
See application file for complete search history.

(56) References Cited

U.S. PATENT DOCUMENTS

| | | | |
|---|---|---|---|
| 7,098,946 B1 * | 8/2006 | Koseki et al. | 348/362 |
| 2001/0016064 A1 * | 8/2001 | Tsuruoka et al. | 382/167 |
| 2003/0128405 A1 * | 7/2003 | Tay | 358/474 |
| 2006/0103745 A1 * | 5/2006 | Nagaishi et al. | 348/294 |

FOREIGN PATENT DOCUMENTS

| | | |
|---|---|---|
| JP | 10-261077 | 9/1998 |
| JP | 10-294892 | 10/1998 |
| JP | 2002-27328 | 1/2002 |
| JP | 2003-199116 | 7/2003 |

OTHER PUBLICATIONS

International Search Report for PCT/JP2007/053765; May 28, 2007.

* cited by examiner

*Primary Examiner* — Usman Khan
(74) *Attorney, Agent, or Firm* — Pearne & Gordon LLP

(57) ABSTRACT

An imaging device (1) includes an all-pixel readout imaging element (2) outputting a LONG signal and a SHORT signal in one field period for each pixel line, a mixing level calculator (7) calculating for each pixel line a mixing level at which the luminance level of the LONG signal is saturated, and an offset calculator (8) calculating for each pixel line an offset that raises the luminance level of the SHORT signal to the mixing level. Level mixing means (9) generates a level mixed signal for each pixel line so as to obtain a LONG signal when the luminance level is lower than the mixing level and obtain a SHORT signal with the offset added when the luminance level is higher than the mixing level. Consequently, an image having a wide dynamic range and a high resolution can be obtained and line-to-line luminance differences in the obtained image can be suppressed.

5 Claims, 11 Drawing Sheets

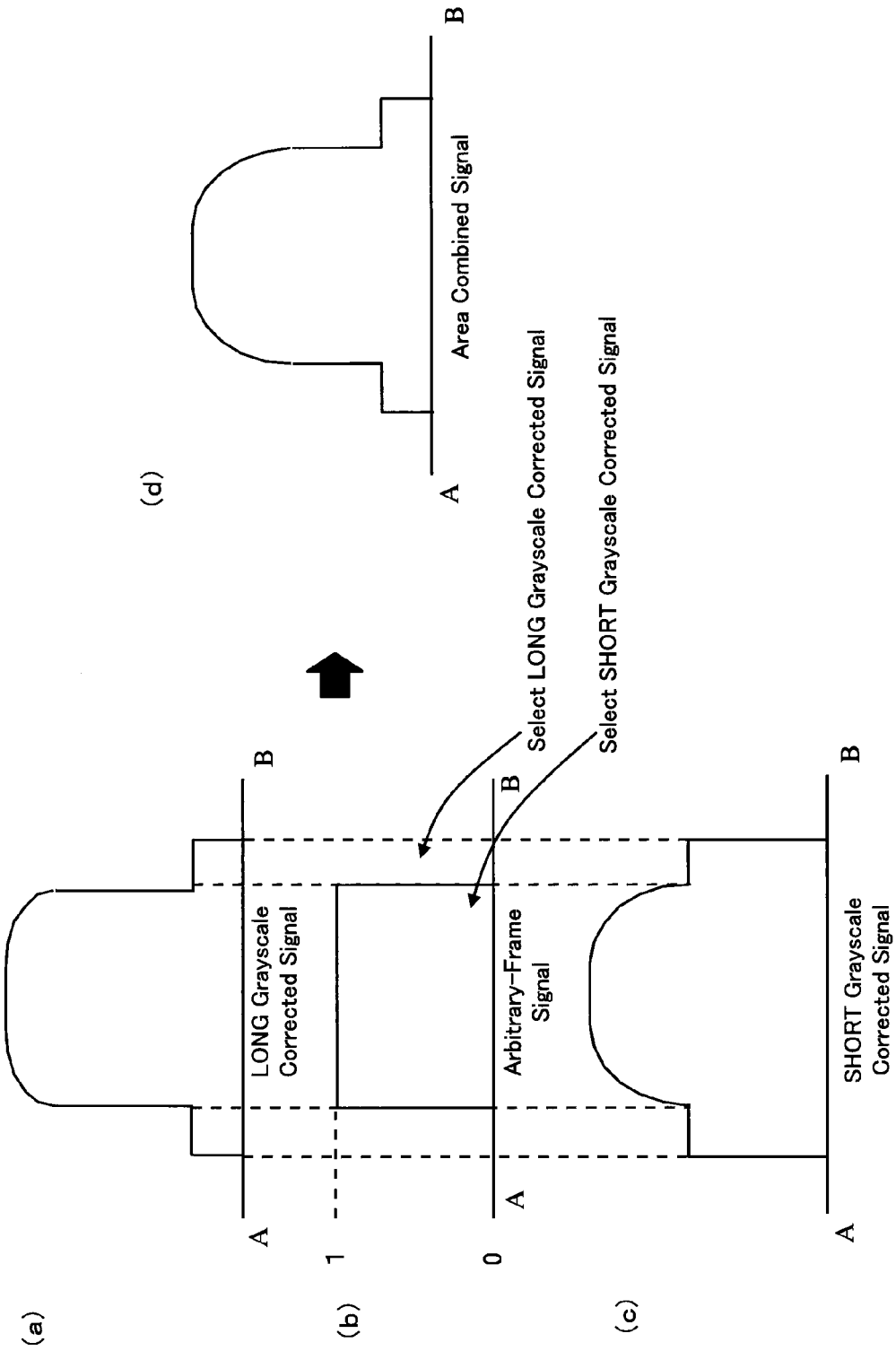

VIDEO SIGNAL PROCESSING FOR GENERATING A LEVEL MIXED SIGNAL

TECHNICAL FIELD

The present invention relates to an imaging device used in video camcorders and the like, capable of providing images having a wide dynamic range and a high resolution and suppressing occurrence of line-to-line luminance differences.

BACKGROUND ART

Imaging devices having extended dynamic ranges have been known heretofore. For example, Japanese Patent Application Laid-Open No. 10-261077 (pages 3-5 and FIG. 1) discloses an imaging device including imaging means that has a horizontal CCD transfer rate twice as high as that of an ordinary transfer rate and is capable of outputting a long-exposure-time video signal and a short-exposure-time video signal in one field period.

In conventional imaging devices, imaging means performs pixel addition. A video signal output from the imaging means is subjected to preprocessing such as CDS (Correlated Double Sampling) and AGC (Automatic Gain Control) in preprocessing means and then is converted to a digital signal by A/D converting means. The digital signal is then input in time axis conversion means and separated into a long-exposure-time image signal (LONG signal) and a short-exposure-time image signal (SHORT signal) which are transmitted at a standard rate and the same timing.

Level mixing means receives the LONG and SHORT signals, compresses the LONG signal which has reached the saturation point and adds an offset to the SHORT signal. The level mixing means generates a mixed signal so as to obtain a LONG signal when the luminance level is lower than a mixing point and obtain a SHORT signal when the luminance level is higher than the mixing point, where the mixing point (mixing level) is the saturation point.

Histogram data detecting means detects a histogram of the luminance of the mixed signal. Block data detecting means divides the mixed signal into blocks and detects the average luminance of each block. Based on the detected average luminance, area border position data calculating means determines area border positions. Grayscale correction data calculating means calculates a grayscale correction characteristic in each of the areas into which the screen is divided. Area grayscale correction means corrects the grayscale on the basis of the grayscale correction characteristic.

In accordance with the calculated area border positions, area division pulse generating means generates a control pulse for dividing, and for combining, the area of the mixed signal. Area combining means combines images the grayscales of which have been corrected on the basis of the control pulse. Main signal processing means performs main signal processing of the imaging device and outputs a signal. In this way, the conventional imaging device mixes LONG and SHORT signals to provide an image having an extended dynamic range.

However, in conventional imaging devices, pixels of four colors, Mg (magenta), G (green), Cy (cyan), and Ye (yellow), are arranged in a predetermined pattern on an imaging area of an imaging element. For example, pixels are arranged in a conventional imaging element in such a manner that a pixel line of Mg and G (first pixel line) and a pixel line of Cy and Ye (second pixel line) are alternately formed. Because pixel addition is performed in the conventional imaging devices in order to improve the sensitivity of the imaging element, the resolution of the imaging element decreases accordingly.

It could be contemplated that an all-pixel readout imaging element which does not perform pixel addition is used in order to provide images with a higher resolution. However, pixels of the four colors of the imaging element have different sensitivities to incident light and therefore different pixel lines of the imaging element have different sensitivities to incident light. Accordingly, if an all-pixel readout imaging element is simply used in a conventional imaging device, the first and second pixel lines can exhibit different luminance levels (signal levels) even in an area in which the pixels should have the same luminance level due to different sensitivities of the pixels because pixel addition is not performed. For example, when the quantity of light having a wavelength to which Cy and Ye pixels are highly sensitive is small in a bright area in which a SHORT signal should be used, second pixel lines (pixel lines of Cy and Ye) will be interpreted as a dark area and a LONG signal will be used in the area.

If the conventional level mixing described above is simply performed, SHORT signal pixel lines (for example the first pixel lines) and pixel lines changed to LONG signal lines (for example the second pixel lines) exist in an area in which the same exposure time signal should be used. As a result, line-to-line luminance differences are produced in an image obtained by mixing LONG and SHORT signals.

DISCLOSURE OF THE INVENTION

The present invention has been made in the circumstances described above. An object of the present invention is to provide an imaging device capable of providing images that have a wide dynamic range and a high resolution and suppressing line-to-line luminance differences in the images.

One aspect of the present invention is an imaging device including: an all-pixel readout imaging unit outputting two types of signals, a LONG signal and a SHORT signal, for each pixel line in a predetermined field period, the LONG signal being a long-exposure-time video signal and the SHORT signal being a short-exposure-time video signal; a mixing level calculator calculating, for each pixel line, a mixing level at which a luminance level of the LONG signal is saturated; an offset calculator calculating, for each pixel line, an offset that raises a luminance level of the SHORT signal to the mixing level; and a level mixer generating a level mixed signal for each pixel line so as to obtain the LONG signal when the luminance level of the video signal is lower than the mixing level and obtain the SHORT signal with the offset added when the luminance level of the video signal is higher than the mixing level.

Another aspect of the present invention is a video signal processing method including: outputting two types of signals, a LONG signal and a SHORT signal, for each pixel line in a predetermined field period, the LONG signal being a long-exposure-time video signal and the SHORT signal being a short-exposure-time video signal; calculating, for the each pixel line, a mixing level at which a luminance level of the LONG signal is saturated; calculating, for the each pixel line, an offset that raises a luminance level of the SHORT signal to the mixing level; and generating a level mixed signal for the each pixel line so as to obtain the LONG signal when the luminance level of the video signal is lower than the mixing level and obtain the SHORT signal with the offset added when the luminance level of the video signal is higher than the mixing level.

Yet another aspect of the present invention is a video signal processing program for processing two types of signals, a LONG signal and a SHORT signal, output for each pixel line in a predetermined field period, the LONG signal being a long-exposure-time video signal, the SHORT signal being a short-exposure-time video signal, the program causing a computer to execute the steps of: calculating, for the each pixel line, a mixing level at which a luminance level of the LONG signal is saturated; calculating, for the each pixel line, an offset that raises a luminance level of the SHORT signal to the mixing level; and generating a level mixed signal for the each pixel line so as to obtain the LONG signal when the luminance level of the video signal is lower than the mixing level and obtain the SHORT signal with the offset added when the luminance level of the video signal is higher than the mixing level.

As will be described below, there are other aspects of the present invention. Therefore, the disclosure of the present invention is intended to provide some of the aspects of the present invention and is not intended to limit the scope of the present invention described and claimed herein.

BRIEF DESCRIPTION OF THE DRAWINGS

FIG. 11 is a diagram illustrating an operation of an area combiner in an embodiment of the present invention.

DESCRIPTION OF SYMBOLS

Figure 1:
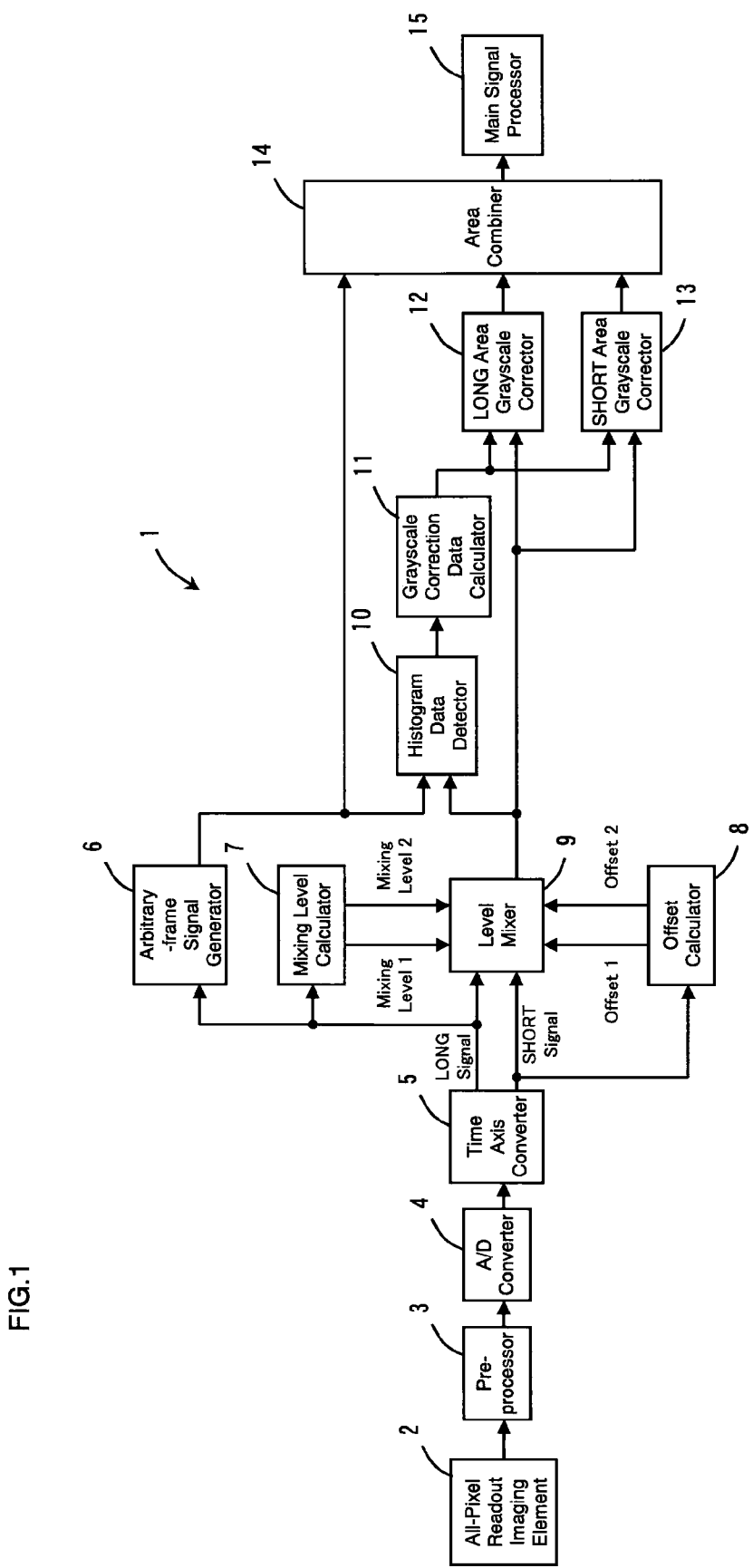
FIG. 1 is a block diagram of an imaging device in an embodiment of the present invention.

1 Imaging device
2 All-pixel readout imaging element
7 Mixing level calculator
8 Offset calculator
9 Level mixer
71 Line counter
72 Line selector
73 Adder
74 Divider
75 Subtracter
76 Line-to-line mixing level calculator
81 Line counter
82 Line selector
83 Adder
84 Divider
85 Subtracter
86 Line offset calculator
91 Line counter
92 Line selector
93 Compressor
94 Adder
95 Mixer

BEST MODE FOR CARRYING OUT THE INVENTION

The present invention will be described in detail below. However, the following detailed description and the accompanying drawings are not intended to limit the present invention. Instead, the scope of the present invention is defined by the appended claims.

An imaging device according to the present invention includes: an all-pixel readout imaging unit outputting two types of video signals, a LONG signal, which is a long-exposure-time video signal, and a SHORT signal, which is a short-exposure-time video signal, for each pixel line in a predetermined field period; a mixing level calculator calculating, for each pixel line, a mixing level at which the luminance level of the LONG signal is saturated; an offset calculator calculating, for each pixel line, an offset that raises the luminance level of the SHORT signal to the mixing level; and a level mixer generating a level mixed signal for each pixel line so as to obtain a LONG signal when the luminance level of the video signal is lower than the mixing level and obtain a SHORT signal with the offset added when the luminance level of the video signal is higher than the mixing level.

With this configuration, a mixing level and an offset are calculated for each pixel line and a level mixed signal is generated for each pixel line. Accordingly, when the luminance level varies from one pixel line to another in an area that should have the same luminance level due to differences in sensitivities of pixels, a level mixed signal according to the luminance level of each pixel line can be generated. Consequently, generation of pixel lines on which LONG and SHORT signals alternately appear in an area that should have the same luminance level can be suppressed and occurrence of line-to-line luminance differences in the image provided can be restrained.

Furthermore, the imaging device according to the present invention may have a configuration in which the all-pixel readout imaging unit has adjacent first and second pixel lines having different color arrangements, the mixing level calculator calculates a first mixing level for the first pixel line and a second mixing level for the second pixel line on the basis of the difference in the luminance level between the first and second pixel lines, the offset calculator calculates a first offset for the first pixel line and a second offset for the second pixel line on the basis of the difference in the luminance level between the first and second pixel lines, and the level mixer generates a level mixed signal for the first pixel line by using the first mixing level and the first offset and generates a level mixed signal for the second pixel line by using the second mixing level and the second offset.

With this configuration, the first mixing level and the first offset for the first pixel line and the second mixing level and the second offset for the second pixel line are calculated in accordance with the difference in luminance level between the first and second pixel lines. Then, the level mixed signal is generated by using the first mixing level and offset or the second mixing level and offset, depending on whether the luminance level of each pixel line is high or low. Accordingly, when the luminance level differs between the first pixel line and the second pixel line in an area that should have the same luminance level due to differences in sensitivities of pixels, a level mixed signal according to the difference in luminance level between the first pixel line and the second pixel line can be generated. Consequently, generation of pixel lines on which LONG and SHORT signals alternately appear in an area that should have the same luminance level can be suppressed and occurrence of line-to-line luminance differences in the image provided can be restrained.

Furthermore, the imaging device according to the present invention may have a configuration in which the mixing level calculator calculates the difference in luminance level between the first and second pixel lines, adds the difference in luminance level to a predetermined reference mixing level to obtain a first mixing level, and subtracts the difference in luminance level from the reference mixing level to obtain a second mixing level, the offset calculator calculates the difference in luminance level between the first and second pixel lines, adds the difference in luminance level to a predetermined reference offset to obtain the first offset, and subtracts the difference in luminance level from the reference offset to obtain the second offset.

With this configuration, the first and second mixing levels according to the difference in luminance level between the first and second pixel lines can be calculated by using the predetermined reference mixing level and the first and second offsets according to the difference in luminance level between the first and second pixel lines can be calculated by using the predetermined reference offset.

A video signal processing method according to the present invention outputs two types of video signals, a LONG signal which is a long-exposure-time video signal and a SHORT signal which is a short-exposure-time video signal, for each pixel line in a predetermined field period, calculates for each pixel line a mixing level at which the luminance level of the LONG signal is saturated, calculates for each pixel line an offset that raises the luminance level of the SHORT signal to the mixing level, and generates a level mixed signal for each pixel line so as to obtain a LONG signal when the luminance level of the video signal is lower than the mixing level and obtain a SHORT signal with the offset added when the luminance level of the video signal is higher than the mixing level.

By this method, a mixing level and offset are calculated for each pixel line and a level mixed signal is generated for each pixel line. Accordingly, when the luminance level varies from one pixel line to another in an area that should have the same luminance level due to differences in sensitivities of pixels, a level mixed signal according to the luminance level of each pixel line can be generated. Consequently, generation of pixel lines on which LONG and SHORT signals alternately appear in an area that should have the same luminance level can be suppressed and occurrence of line-to-line luminance differences in the image provided can be restrained.

A video signal processing program according to the present invention is a video signal processing program for processing two types of signals, a LONG signal and a SHORT signal, output for each pixel line in a predetermined field period, the LONG signal being a long-exposure-time video signal, the SHORT signal being a short-exposure-time video signal, the program causing a computer to execute the steps of: calculating, for the each pixel line, a mixing level at which a luminance level of the LONG signal is saturated; calculating, for the each pixel line, an offset that raises a luminance level of the SHORT signal to the mixing level; and generating a level mixed signal for the each pixel line so as to obtain the LONG signal when the luminance level of the video signal is lower than the mixing level and obtain the SHORT signal with the offset added when the luminance level of the video signal is higher than the mixing level.

By this program, a mixing level and offset are calculated for each pixel line and a level mixed signal is generated for each pixel line. Accordingly, when the luminance level varies from one pixel line to another in an area that should have the same luminance level due to differences in sensitivities of pixels, a level mixed signal according to the luminance level of each pixel line can be generated. Consequently, generation of pixel lines on which LONG and SHORT signals alternately appear in an area that should have the same luminance level can be suppressed and occurrence of line-to-line luminance differences in the image provided can be restrained.

The present invention provides mixing level calculating means for calculating a mixing level for each pixel line and offset calculating means for calculating an offset for each pixel line. The level mixing means performs level mixing processing by using the mixing level and offset for each pixel line so that an image with a wide dynamic range and a high resolution can be obtained and generation of line-to-line luminance differences in the obtained image can be suppressed.

An imaging device according to an embodiment of the present invention will be described with reference to the drawings. In the present embodiment, an imaging device used in a device such as a video camcorder will be described by way of example. Video signal processing performed in the imaging device is implemented by a program stored in a memory of the imaging device.

FIG. 1 is a block diagram of the imaging device according to the exemplary embodiment of the present invention. As shown in FIG. 1, the imaging device 1 according to the present embodiment includes an all-pixel readout imaging element 2, a preprocessor 3, an A/D convertor 4, a time axis convertor 5, an arbitrary-frame signal generator 6, a mixing level calculator 7, an offset calculator 8, a level mixer 9, a histogram data detector 10, a grayscale correction data calculator 11, a LONG area grayscale corrector 12, a SHORT area grayscale corrector 13, an area combiner 14, and a main signal processor 15. Here, the all-pixel readout imaging element 2 represents all-pixel readout imaging means of the present invention. The mixing level calculator 7 represents mixing level calculating means of the present invention and the offset calculator 8 represents offset calculating means of the present invention. The level mixer 9 represents level mixing means of the present invention.

Figure 2:
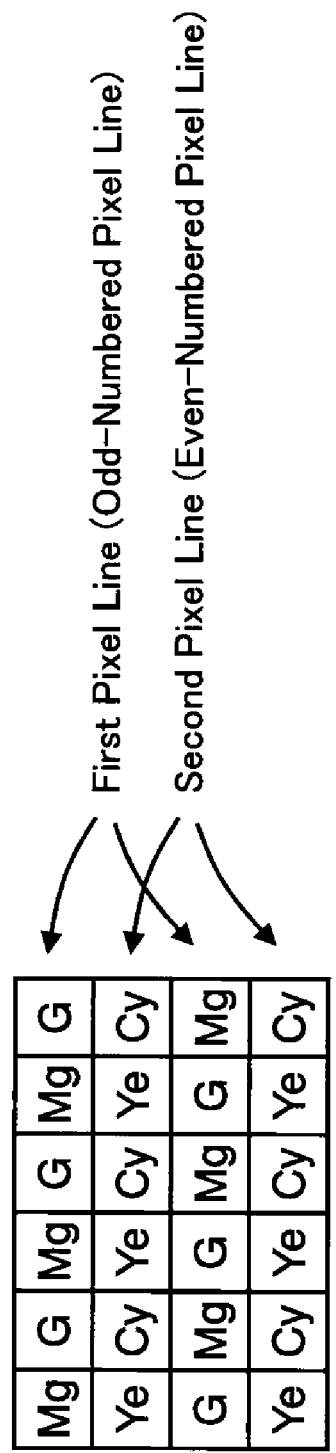
FIG. 2 is a diagram illustrating a pattern in which pixels of an imaging element are arranged in an embodiment of the present invention.

The all-pixel readout imaging element 2 may be a solid-state imaging element such as a CCD or CMOS and includes an array of two-dimensional pixels. In the present embodiment, pixels of four colors, Mg (magenta), G (green), Cy (cyan), and Ye (yellow), are arranged in a predetermined pattern as shown in FIG. 2. Pixels are arranged in such a manner that a pixel line of Mg and G (first pixel line) and a pixel line of Cy and Ye (second pixel line), for example, are alternately arranged. That is, the pixels of the four colors are arranged in such a manner that the pixel lines of Mg and G (first pixel lines) are the odd-numbered pixel lines of the all-pixel readout imaging element 2 and the pixel lines of Cy and Ye (second pixel lines) are the even-numbered pixel lines. It can be said that the all-pixel readout imaging element 2 has adjacent first pixel lines (pixel lines of Mg and G) and second pixel lines (pixel lines of Cy and Ye) that have different color arrangements. Only a portion of the pattern of the pixels of the imaging element 2 is shown in FIG. 2 for convenience of explanation.

The imaging element 2 outputs a long-exposure-time video signal (LONG signal) and a short-exposure-time video signal (SHORT signal). In doing this, the imaging element 2 uses the CCD's horizontal transfer rate twice as high as that of an ordinary transfer rate, thereby alternately outputting the LONG signal and the SHORT signal for each horizontal pixel line in one field period. That is, one field of the LONG signal and one field of SHORT signal are output in a period during which one filed of video signal would be output in normal imaging. Because the all-pixel readout imaging element 2 does not perform pixel addition, the video signal of one pixel line of Mg and G (first pixel line) and the video signal of one pixel line of Cy and Ye (second pixel line) are alternately output for each pixel line.

The preprocessor 3 includes a CDS circuit which performs noise reduction and an AGC circuit which performs gain control processing. The preprocessor 3 applies preprocessing such as noise reduction and gain control to a video signal output from the imaging element 2. The A/D convertor 4 converts the analog video signal output from the preprocessor 3 to a digital signal.

The time axis convertor 5 separately converts the time axes of the LONG and SHORT signals generated by the imaging element 2, thereby allowing the LONG and SHORT signals to be adjusted at a standard rate and at the same timing. The video signals output from the imaging element 2 through the time axis convertor 5 is separated into a LONG signal and SHORT signal so that they can be independently handled.

Figure 3:
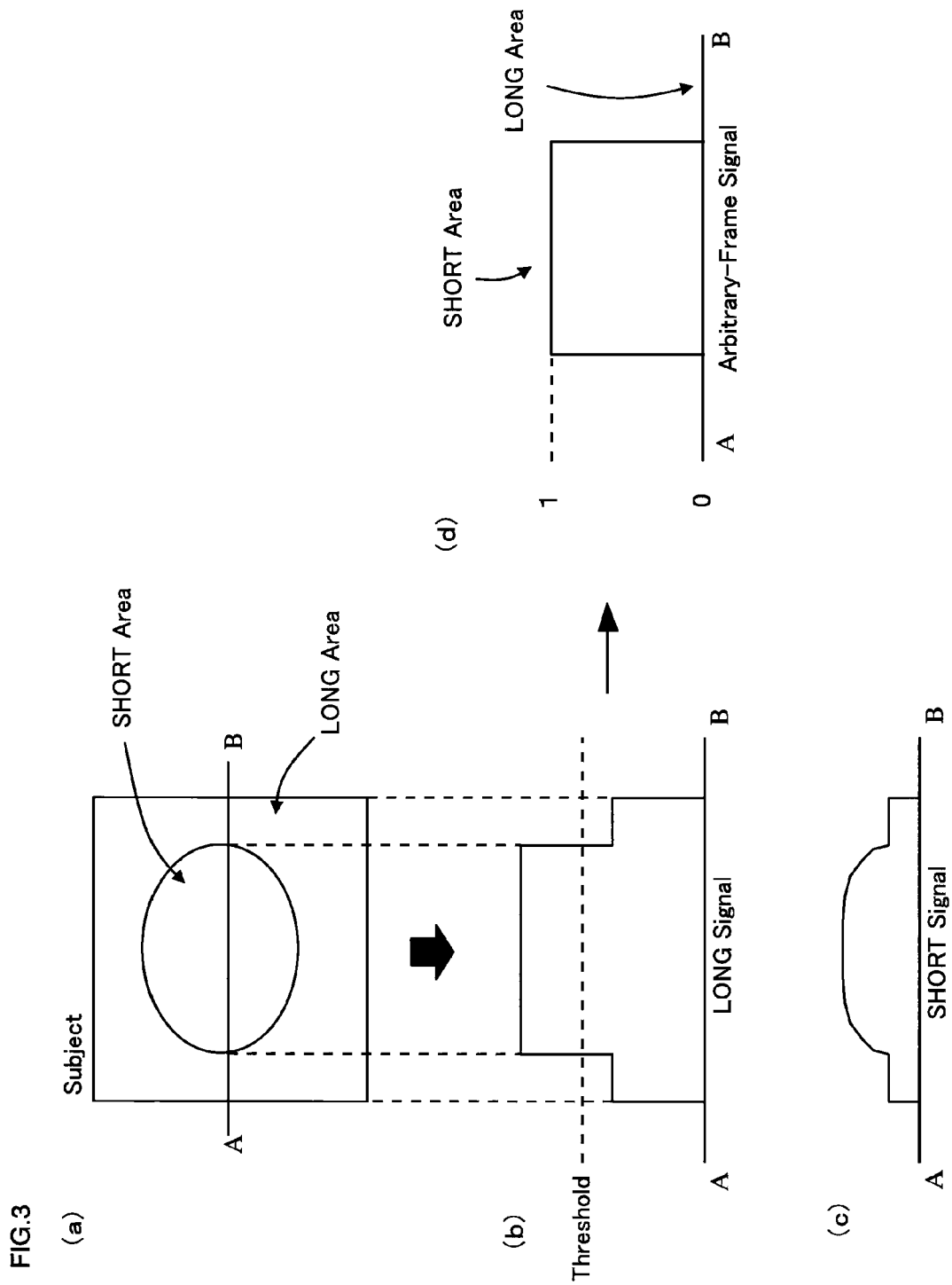
FIG. 3 is a diagram illustrating an operation of arbitrary-frame signal generator in an embodiment of the present invention.

FIGS. 3(a) to 3(d) are diagrams illustrating an operation of the arbitrary-frame signal generator 6. A case will be described here in which a subject as shown in FIG. 3(a) is captured by the all-pixel readout imaging element 2. The subject has a SHORT area which is an elliptical, high-luminance area and a LONG area which is a low-luminance area surrounding the SHORT area. FIG. 3(b) shows a signal level corresponding to line A-B on the subject in a LONG signal obtained through the time axis convertor 5. FIG. 3(c) shows a signal level corresponding to line A-B on the subject in a SHORT signal obtained through the time axis convertor 5. The arbitrary-frame signal generator 6 compares the luminance level of the LONG signal with a threshold and generates an arbitrary-frame signal in which an area with a luminance level lower than the threshold is represented by 0 and an area with a luminance level higher than the threshold is represented by 1. For example, FIG. 3(d) shows an arbitrary-frame signal when the subject is viewed in the horizontal direction A-B. The area represented by 0 in the arbitrary-frame signal is the LONG area and the area represented by 1 is the SHORT area. In this way, the video signal is divided into two areas, LONG and SHORT areas, by the arbitrary-frame signal generator 6.

Figure 4:
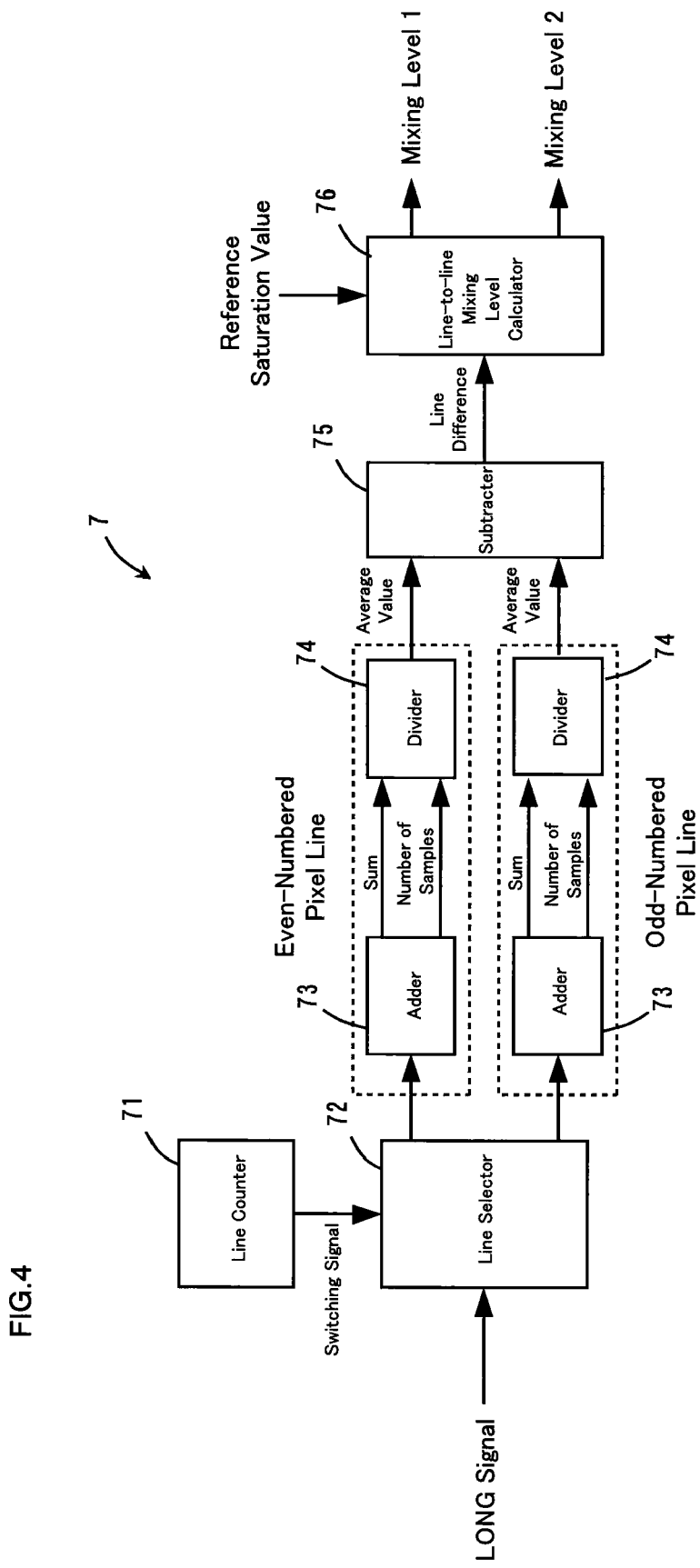
FIG. 4 is a block diagram of a mixing level calculator in an embodiment of the present invention.

FIG. 4 is a block diagram of the mixing level calculator 7. As shown in FIG. 4, the mixing level calculator 7 includes a line counter 71, a line selector 72, two adders 73, two dividers 74, a subtracter 75, and a line-to-line mixing level calculator 76. The line counter 71 counts the pixel lines and generates a switching signal for distinguishing between an odd-numbered pixel line (first pixel line) and an even-numbered pixel line (second pixel line). The line selector 72 separates the LONG signal into an even-numbered pixel line and an odd-numbered pixel line on the basis of the switching signal. All pixels of each of the even-numbered pixel line and the odd-numbered pixel line are added together in each adder 73 to obtain the sum. At the same time, the number of samples which is the number of the pixels added together (the number of all pixels of each pixel line) is counted. Each of the dividers 74 divides the sum by the number of the samples to obtain the average value of the even-numbered pixel line and the average value of the odd-numbered pixel line. The subtracter 75 subtracts the average value of the even-numbered pixel line from the average value of the odd-numbered pixel line and outputs a line difference.

The line-to-line mixing level calculator 76 performs the following processing on a predetermined reference mixing level (reference saturation value) provided from a microcomputer, not shown, by using the line difference. That is, the line-to-line mixing level calculator 76 adds the line difference to the reference mixing level and outputs the sum as mixing level 1; the line-to-line mixing level calculator 76 subtracts the line difference from the reference mixing level and outputs the result as mixing level 2. In this way, mixing level 1 or mixing level 2 is generated for each pixel line at the mixing level calculator 7. Here, mixing level 1 represents a first mixing level for the first pixel line (odd-numbered pixel line) and mixing level 2 represents a second mixing level for the second pixel line (even-numbered pixel line).

Figure 5:
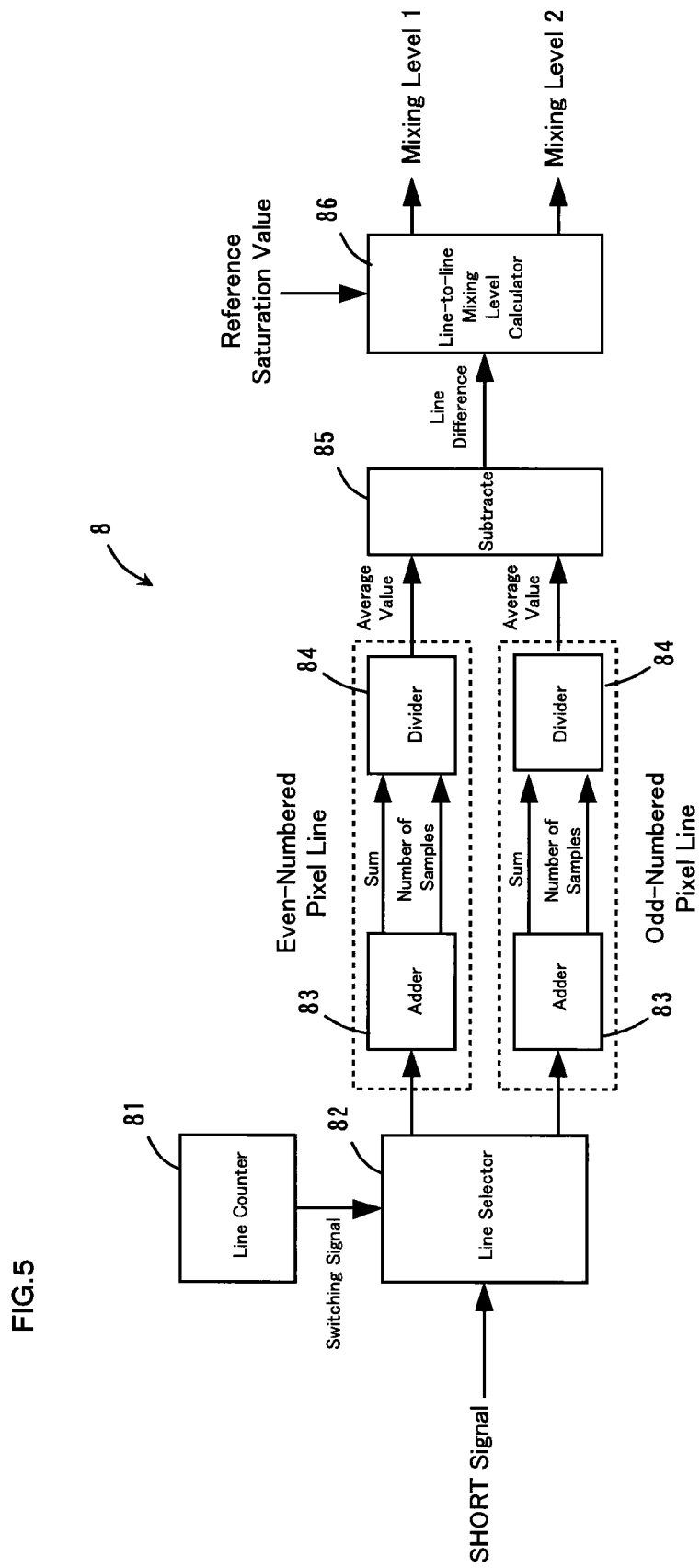
FIG. 5 is a block diagram of an offset value calculator in an embodiment of the present invention.

FIG. 5 is a block diagram of the offset calculator 8. As shown in FIG. 5, the offset calculator 8 includes a line counter 81, a line selector 82, two adders 83, two dividers 84, a subtracter 85, and a line offset calculator 86. The line counter 81 counts pixels lines and generates a switching signal for distinguishing between an odd-numbered pixel line (first pixel line) and an even-numbered pixel line (second pixel line). The line selector 82 separates a SHORT signal into an even-numbered pixel line and an odd-numbered pixel line on the basis of the switching signal. All pixels of each of the even-numbered pixel line and the odd-numbered pixel line are added together in each adder 83 to obtain the sum. At the same time, the number of samples which is the number of the pixels added together (the number of all pixels of each pixel line) is counted. Each of the dividers 84 divides the sum by the number of the samples to obtain the average value of the even-numbered pixel line and the average value of the odd-numbered pixel line. The subtracter 85 subtracts the average value of the even-numbered pixel line from the average value of the odd-numbered pixel line and outputs a line difference.

The line offset calculator 86 performs the following processing on a predetermined reference offset provided from the microcomputer, not shown, by using the line difference. That is, the line offset calculator 86 adds the line difference to the reference offset and outputs the sum as offset 1; the line offset calculator 86 subtracts the line difference from the reference offset and outputs the result as offset 2. In this way, offset 1 or offset 2 is generated for each pixel line at the offset calculator 8. Here, offset 1 represents a first offset for the first pixel line (odd-numbered pixel line) and offset 2 represents a second offset for the second pixel line (even-numbered pixel line).

Figure 6:
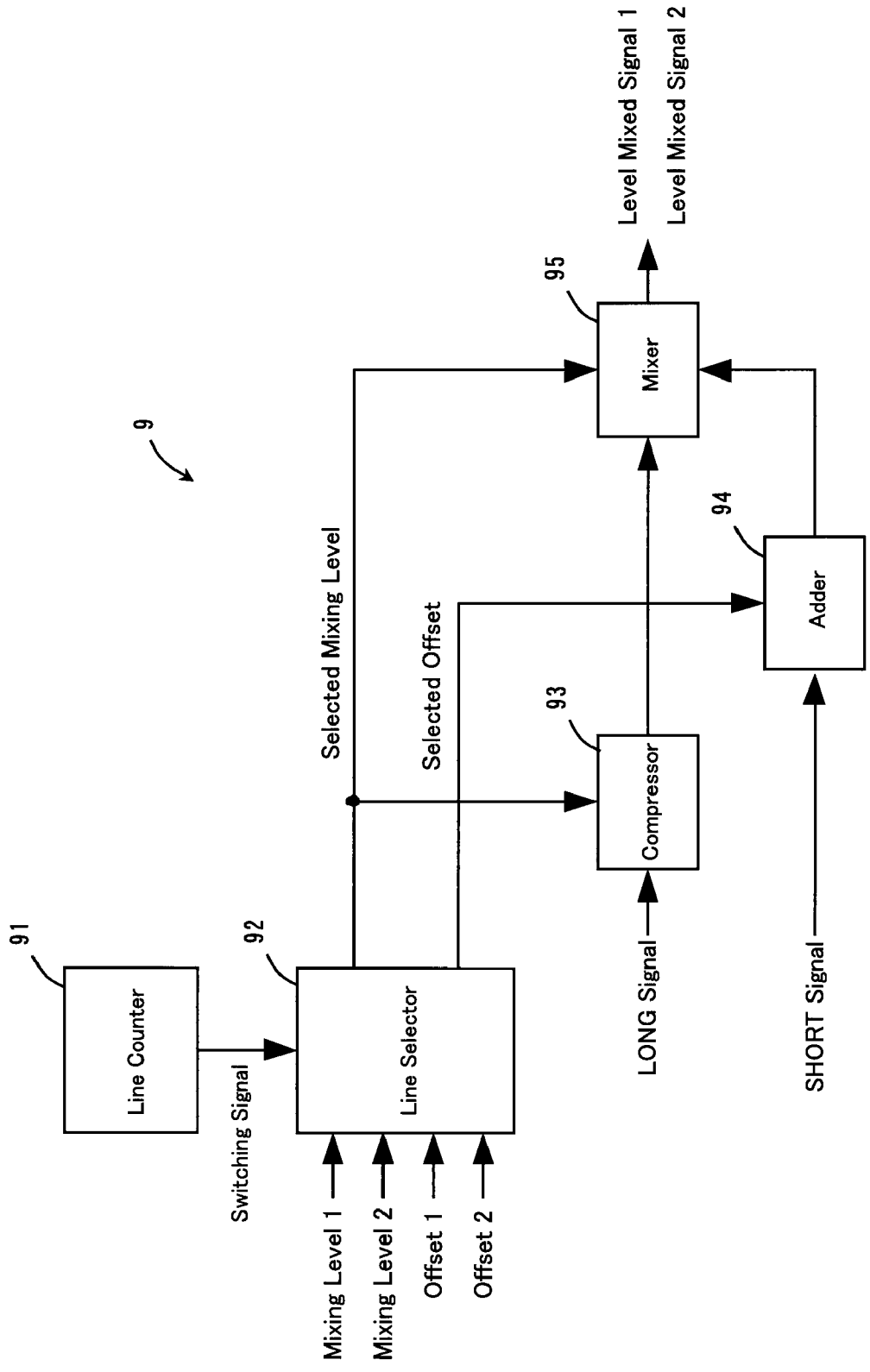
FIG. 6 is a block diagram of a level mixer in an embodiment of the present invention.

FIG. 6 is a block diagram of the level mixer 9. As shown in FIG. 6, the level mixer 9 includes a line counter 91, a line selector 92, a compressor 93, an adder 94, and a mixer 95. The line counter 91 counts pixel lines and generates a switching signal for distinguishing between an odd-numbered pixel line (first pixel line) and an even-numbered pixel line (second pixel line). The line selector 92 selects mixing level 1 or mixing level 2 in accordance with the switching signal and alternately outputs mixing level 1 and mixing level 2 as a selected mixing level; the line selector 92 selects offset 1 or offset 2 on the basis of the switching signal and alternately outputs offset 1 and offset 2 as a selected offset. That is, when an odd-numbered pixel line is encountered, mixing level 1 and offset 1 are selected; when an even-numbered pixel line is encountered, mixing level 2 and offset 2 are selected.

The compressor 93 compresses a LONG signal which has reached the selected mixing level, which is a saturation point. The adder 94 adds the selected offset to a SHORT signal. The mixer 95 mixes the LONG signal and the SHORT signal to generate a level mixed signal so as to obtain a LONG signal when the luminance level is lower than or equal to the selected mixing level and obtain a SHORT signal when the luminance level is higher than or equal to the selected mixing level.

Figure 7:
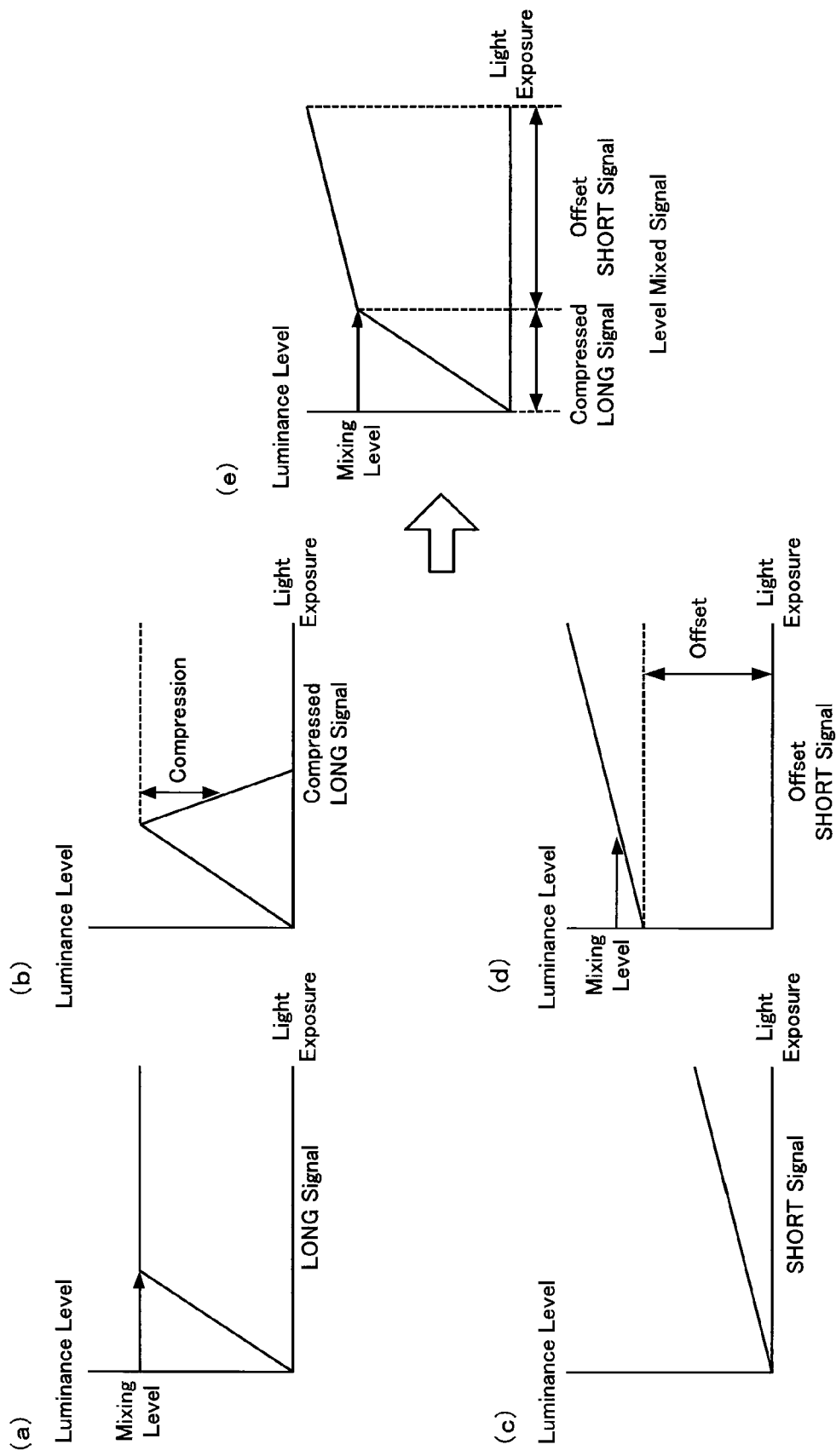
FIG. 7 is a diagram illustrating an operation of a level mixer in an embodiment of the present invention.

FIGS. 7(a) to 7(e) are diagrams illustrating an operation of the level mixer 9. As shown in FIGS. 7(a) and 7(b), the compressor 93 of the level mixer 9 compresses a LONG signal which has reached the mixing level. The adder 94 of the level mixer 9 adds an offset to a SHORT signal. The mixer 95 of the level mixer 9 generates a level mixed signal so as to obtain a LONG signal when the luminance level is lower than or equal to the mixing level and obtain a SHORT signal when the luminance level is higher than or equal to the mixing level.

Figure 8:
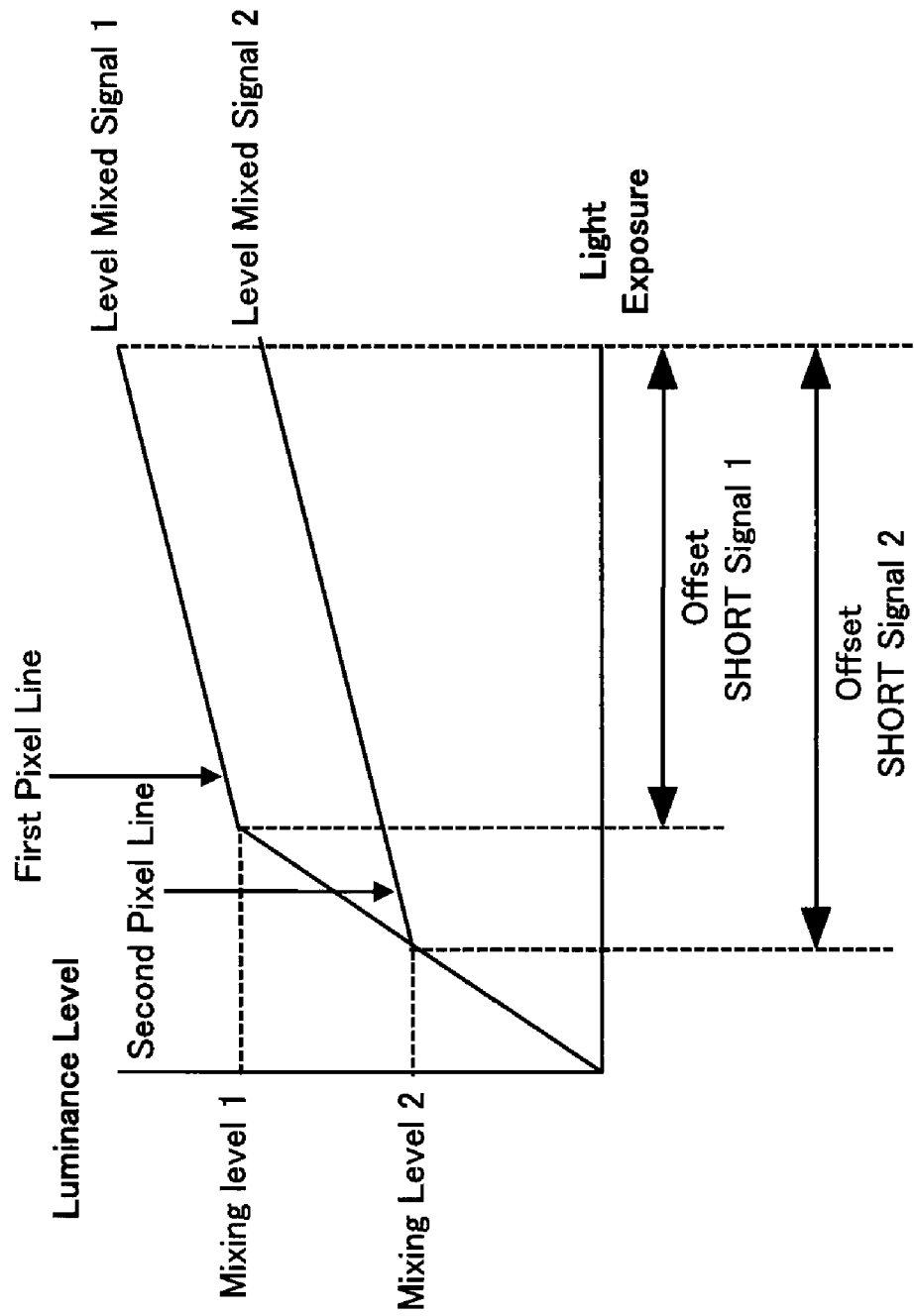
FIG. 8 is a diagram illustrating an operation (level mixing for each pixel line) of a level mixer in an embodiment of the present invention.

The level mixing is performed on a pixel-line-by-pixel-line basis. FIG. 8 is a diagram illustrating an operation of the level mixing for each pixel line performed in the level mixer 9. Different pixel lines in an area that should have the same luminance level can have different luminance levels due to differences in sensitivities of pixels. For example, when the quantity of light of a wavelength highly sensitive to Cy and Ye is small in an area that should be bright, the luminance level of a second pixel line (pixel line of Cy and Ye) will be low. In such a case, according to the present embodiment, mixing level 1 and offset 1 are selected for a first pixel line to generate level mixed signal 1 and mixing level 2 and offset 2 are selected for a second pixel line to generate level mixed signal 2 as shown in FIG. 8. In this way, offset SHORT signal 1 (SHORT signal with offset 1 added) is used on first pixel lines having high luminance levels and offset SHORT signal 2 (SHORT signal with offset 2 added) is used on second pixel lines having low luminance levels. That is, alternate appearance of LONG and SHORT signals on adjacent pixel lines in a bright area in which a SHORT signal should be used is suppressed.

Figure 9:
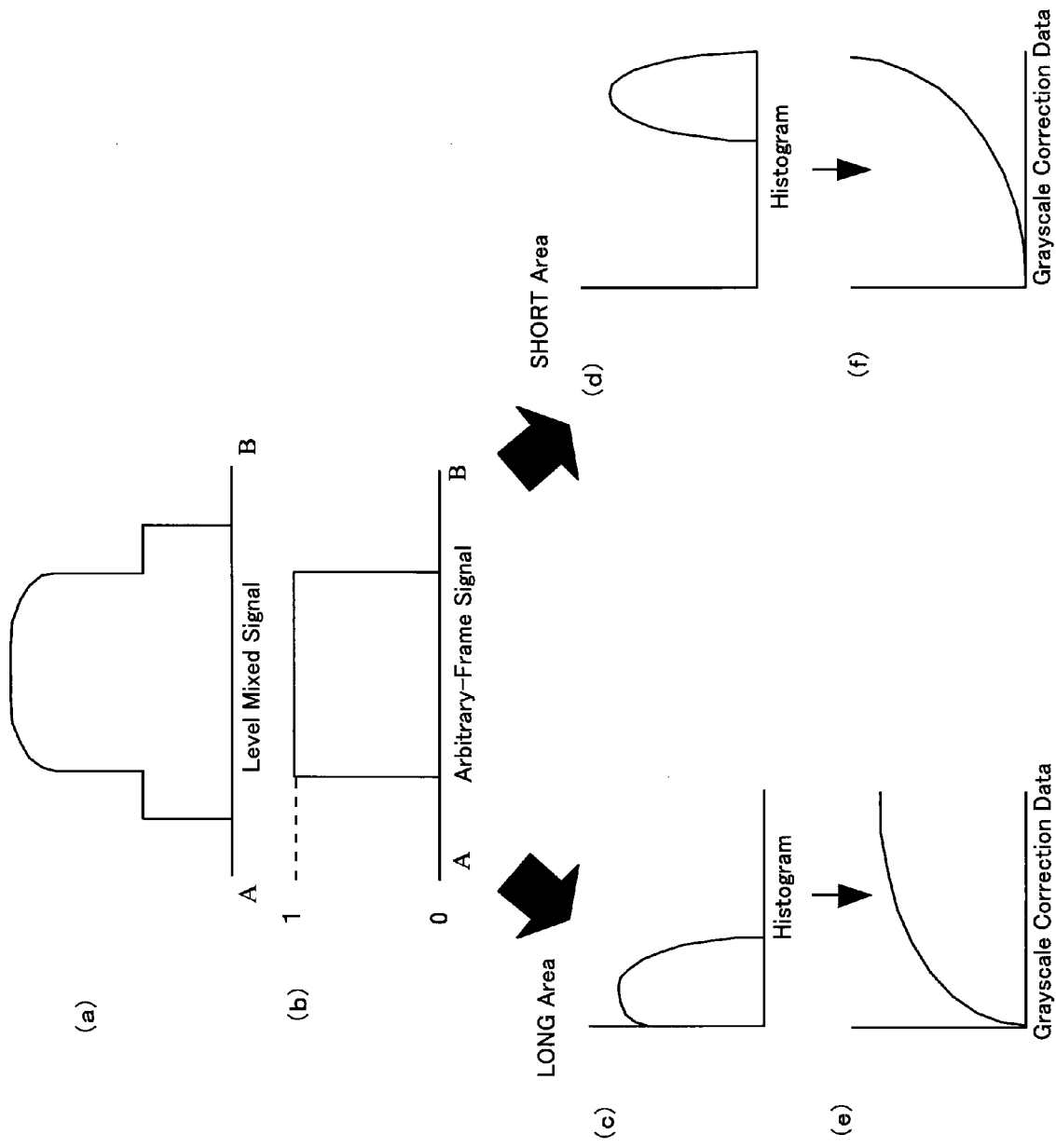
FIG. 9 is a diagram illustrating an operation of a histogram data detector and a grayscale correction data calculator in an embodiment of the present invention.
Figure 10:
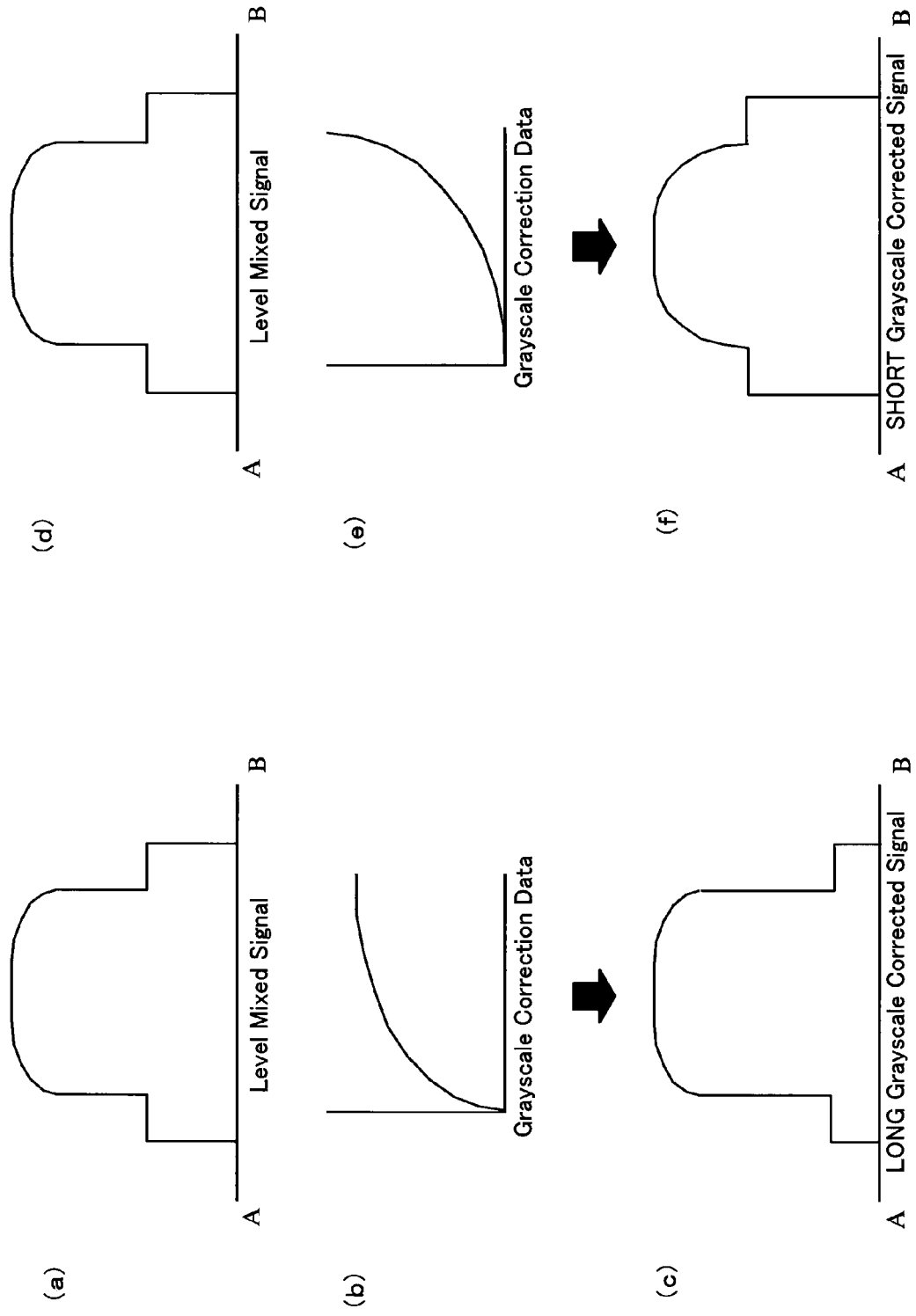
FIG. 10 is a diagram illustrating an operation of a LONG area grayscale corrector and a SHORT area grayscale corrector in an embodiment of the present invention.

FIGS. 9(a) to 9(f) show an operation of the histogram data detector 10 and the grayscale correction data calculator 11. FIG. 9(a) shows a mixed signal mixed at the level mixer 9. The histogram data detector 10 detects a histogram in each of LONG and SHORT areas indicated by an arbitrary-frame signal (see FIG. 9(b)) in a mixed signal generated at the level mixer 9. When the histogram of the LONG area represented by 0 in the arbitrary-frame signal is calculated, the histogram exhibits the characteristic of concentrating in a dark portion as shown in FIG. 9(c) because the LONG area represents the dark area of the subject. The histogram of the SHORT area represented by 1 in the arbitrary-frame signal has the characteristic of concentrating in a bright portion as shown in FIG. 9(d) because the SHORT area represents the bright area of the subject.

Then, the grayscale correction data calculator 11 uses the histograms calculated at the histogram data detector 10 to calculate grayscale correction data. The histogram of the LONG area concentrates in a dark portion, therefore grayscale correction data that raises the dark portion as shown in FIG. 9(e) is calculated. On the other hand, the histogram of the SHORT area concentrates in a bright portion, therefore grayscale correction data that raises the bright portion as shown in FIG. 9(f) is calculated.

FIGS. 10(a) to 10(f) show an operation of the LONG area grayscale corrector 12 and the SHORT area grayscale corrector 13. The LONG area grayscale corrector 12 and the SHORT area grayscale corrector 13 use a level mixed signal generated at the level mixer 9 and grayscale correction data to perform grayscale correction. The LONG area grayscale corrector 12 uses grayscale correction data shown in FIG. 10(b) to make grayscale correction to the level mixed signal shown in FIG. 10(a). Consequently, a low-signal-level portion is suppressed and a high-signal level portion is enhanced as in the LONG grayscale corrected signal shown in FIG. 10(c). On the other hand, the SHORT area grayscale corrector 13 uses grayscale correction data shown in FIG. 10(e) to make grayscale correction to the level mixed signal shown in FIG. 10(d). Consequently, a low-signal-level portion is enhanced and a high-signal-level portion is suppressed as in the SHORT grayscale corrected signal shown in FIG. 10(f).

FIGS. 11(a) to 11(d) show an operation of the area combiner 14. As shown in FIG. 11(a), the area combiner 14 switches its output between the LONG grayscale corrected signal generated by the LONG area grayscale corrector 12 (see FIG. 11(a)) and the SHORT grayscale corrected signal generated by the SHORT area grayscale corrector 13 (see FIG. 11(c)) by using the arbitrary-frame signal (see FIG. 11(b)). That is, the area combiner 14 outputs the LONG grayscale corrected signal for an area in which the arbitrary-frame signal is 0, outputs the SHORT grayscale corrected signal for an area in which the arbitrary-frame signal is 1, and mixes the LONG grayscale corrected signal with the SHORT grayscale corrected signal to generate an area combined signal as shown in FIG. 11(d).

The main signal processor 15 applies main signal processing including compression coding to the area combined signal and outputs the resulting output signal to an external device (not shown).

As described above, the all-pixel readout imaging element 2 is used and appropriate mixing levels (mixing levels 1 and 2) and offsets (offsets 1 and 2) are calculated for the first pixel lines (odd-numbered pixel lines) and second pixel lines (even-numbered pixel lines) without performing pixel addition. Then, the mixing levels and offsets are used to mix the LONG and SHORT signals. Therefore, a histogram can be detected in each area captured with an appropriate light exposure and grayscale correction can be calculated. Consequently, an image in which the grayscale of each area is optimally corrected can be provided. Thus, an image with a wide dynamic range can be obtained in which both bright and dark portions of any subject are clearly visible. Furthermore, sine the all-pixel readout imaging element is used, a high-resolution image can be obtained and, in addition, line-to-line luminance differences in the obtained image can be suppressed.

The imaging device 1 according to the embodiment of the present invention described above is capable of providing a high-resolution image with a wide dynamic range and minimizing generation of line-to-line luminance differences in the image because the mixing level calculator 7 calculating a mixing level for each pixel line and the offset calculator 8 calculating an offset for each pixel line are provided and the level mixer 9 uses mixing levels (mixing levels 1 and 2) and an offsets (offsets 1 and 2) for each pixel line to perform level mixing.

That is, in the present embodiment, mixing levels (mixing levels 1 and 2) and offsets (offsets 1 and 2) are calculated for each pixel line and level mixed signals (level mixed signals 1 and 2) are generated for each pixel line. Accordingly, even when the luminance level varies from one pixel line to another in an area that should have the same luminance level due to differences in sensitivities of pixels, a level mixed signal according to the luminance level of each pixel line can be generated. Consequently, generation of pixel lines on which LONG and SHORT signals alternately appear in an area that should have the same luminance level can be suppressed and occurrence of line-to-line luminance differences in the image provided can be restrained.

Furthermore, in the present embodiment, a first mixing level (mixing level 1) and a first offset (offset 1) for a first pixel line are calculated and a second mixing level (mixing level 2) and a second offset (offset 2) for a second pixel line are calculated in accordance with a difference in luminance level between the first pixel line (odd-numbered pixel line) and the second pixel line (even-numbered pixel line). Mixing level 1 and offset 1 or mixing level 2 and offset 2 are used to generate a level mixed signal (level mixed signal 1 or level mixed signal 2), depending on whether the luminance level of each pixel line is high or low. Accordingly, even when an odd-numbered pixel line and an even-numbered pixel line have different luminance levels because of a difference in pixel sensitivity in an area that should have the same luminance level, a level mixed signal according to a difference in luminance level between the odd-numbered pixel line and the even-numbered pixel line can be generated. Consequently, switching between LONG and SHORT signals on every pixel line in the area that should have the same luminance level can be suppressed and generation of line-to-line luminance differences in the image obtained can be restrained.

Furthermore, an appropriate first mixing level (mixing level 1) and second mixing level (mixing level 2) according to the difference in luminance level between the first pixel line (odd-numbered pixel line) and the second pixel line (even-numbered pixel line) can be calculated by using a predetermined reference mixing level and an appropriate first offset (offset 1) and second offset (offset 2) according to a difference in luminance level between the odd-numbered pixel line and the even-numbered pixel line can be calculated by using a predetermined reference offset.

While an embodiment of the present invention has been described by way of examples, the scope of the present invention is not limited to these. Modifications and variations can be made for any purpose within the scope defined in the claims.

For example, an example has been given in the foregoing description in which all pixels of each even-numbered pixel line and all pixels of each odd-numbered pixel line are separately added together at the respective adders 73 in the mixing level calculator 7 to obtain the sums and the average value of the even-numbered pixel line and the average value of the odd-numbered pixel line are calculated. However, the scope of the present invention is not so limited. Pixels of each even-numbered pixel line and pixels of each odd-numbered pixel line may be added at intervals at each adder 73 in the mixing level calculator 7 to obtain the sums and the average value of the even-numbered pixel line and the average value of the odd-numbered line may be calculated. This reduces the load on the circuitry of the mixing level calculator 7.

An example has been given in the foregoing description in which all pixels of each even-numbered pixel line and all pixels of each odd-numbered pixel line are added at the adders 83 in the offset calculator 8 to obtain the sums and the average value of the even-numbered pixel line and the average value of the odd-numbered pixel line are calculated. However, the scope of the present invention is not so limited. Pixels of each pixel even-numbered pixel line and pixels of each odd-numbered pixel line may be added at intervals at each adder 83 in offset calculator 8 to obtain the sums and the average value of the even-numbered pixel line and the average value of the odd-numbered line may be calculated. This reduces the load on the circuitry of the offset calculator 8.

While a presently preferred embodiment of the present invention has been described in the foregoing, it will be understood that various variations of the embodiment is possible and all such variations that fall within the true spirit and scope of the present invention are intended to be included in the appended claims.

Industrial Applicability

As has been described, the imaging device according to the present invention has the effect of providing an image having a wide dynamic range and a high resolution and suppressing generation of line-to-line luminance differences in the image provided and is useful as an imaging device used in a device such as a video camcorder.

The invention claimed is:

1. An imaging device comprising:
an all-pixel readout imaging unit outputting two types of signals, a LONG signal and a SHORT signal, for each pixel line in a predetermined field period, said LONG signal being a long-exposure-time video signal and said SHORT signal being a short-exposure-time video signal;
a mixing level calculator calculating, for said each pixel line, a mixing level at which a luminance level of said LONG signal is saturated;
an offset calculator calculating, for said each pixel line, an offset that raises a luminance level of said SHORT signal to said mixing level; and
a level mixer generating a level mixed signal for said each pixel line so as to obtain said LONG signal when the luminance level of the long-exposure-time video signal is lower than said mixing level and obtain said SHORT signal with said offset added when the luminance level of the long-exposure-time video signal is higher than said mixing level.

2. The imaging device according to claim 1, wherein:
said all-pixel readout imaging unit has a first pixel line and a second pixel line that are adjacent to each other and have different color arrangements;
said mixing level calculator calculates a first mixing level for said first pixel line and a second mixing level for said second pixel line on the basis of a difference in luminance level between said first pixel line and said second pixel line;
said offset calculator calculates a first offset for said first pixel line and a second offset for said second pixel line on the basis of a difference in luminance level between said first pixel line and said second pixel line; and
said level mixer generates said level mixed signal for said first pixel line by using said first mixing level and said first offset and generates said level mixed signal for said second pixel line by using said second mixing level and said second offset.

3. The imaging device according to claim 2, wherein:
said mixing level calculator calculates a difference in luminance level between said first pixel line and said second pixel line, adds said difference in luminance level to a predetermined reference mixing level to obtain said first mixing level, and subtracts said difference in luminance level from said reference mixing level to obtain said second mixing level; and
said offset calculator calculates a difference in luminance level between said first pixel line and said second pixel line, adds said difference in luminance level to a predetermined reference offset to obtain said first offset, and subtracts said difference in luminance level from said reference offset to obtain said second offset.

4. A video signal processing method including:
outputting two types of signals, a LONG signal and a SHORT signal, for each pixel line in a predetermined field period, said LONG signal being a long-exposuretime video signal and said SHORT signal being a short-exposure-time video signal;

calculating by an imaging device, for said each pixel line, a mixing level at which a luminance level of said LONG signal is saturated;

calculating by the imaging device, for said each pixel line, an offset that raises a luminance level of said SHORT signal to said mixing level; and generating, by the imaging device, a level mixed signal for said each pixel line so as to obtain said LONG signal when the luminance level of the long-exposure-time video signal is lower than said mixing level and obtain said SHORT signal with the offset added when the luminance level of the long-exposure-time video signal is higher than said mixing level.

5. A video signal processing program for processing two types of signals, a LONG signal and a SHORT signal, output for each pixel line in a predetermined field period, said LONG signal being a long-exposure-time video signal, said SHORT signal being a short-exposure-time video signal, said program being stored on a non-transitory computer-readable memory and causing a computer to execute the processes of:

calculating, for said each pixel line, a mixing level at which a luminance level of said LONG signal is saturated;

calculating, for said each pixel line, an offset that raises a luminance level of said SHORT signal to said mixing level; and generating a level mixed signal for said each pixel line so as to obtain said LONG signal when the luminance level of the long-exposure-time video signal is lower than said mixing level and obtain said SHORT signal with said offset added when the luminance level of the long-exposure-time video signal is higher than said mixing level.

* * * * *